(12) United States Patent
Wecker et al.

(10) Patent No.: US 11,325,678 B2
(45) Date of Patent: May 10, 2022

(54) BATTERY UNIT, SET WITH A BATTERY UNIT AND A RECEPTACLE DEVICE FOR RECEIVING THE BATTERY UNIT AND BICYCLE FRAME WITH SUCH SET

(71) Applicant: YT INDUSTRIES GMBH, Hausen (DE)

(72) Inventors: Daniel Wecker, Forchheim (DE); Tobias Lehne, Forchheim (DE); Stefan Willared, Pautzfeld (DE); Stefan Bax, Nuremberg (DE); Martin Bosert, Forchheim (DE)

(73) Assignee: YT INDUSTRIES GMBH, Hausen (DE)

( * ) Notice: Subject to any disclaimer, the term of this patent is extended or adjusted under 35 U.S.C. 154(b) by 244 days.

(21) Appl. No.: 16/401,487

(22) Filed: May 2, 2019

(65) Prior Publication Data
US 2019/0337588 A1 Nov. 7, 2019

(30) Foreign Application Priority Data
May 3, 2018 (DE) ...................... 10 2018 206 821.6

(51) Int. Cl.
*B62M 6/90* (2010.01)
*B62K 19/40* (2006.01)
*H01M 50/20* (2021.01)

(52) U.S. Cl.
CPC .............. *B62M 6/90* (2013.01); *B62K 19/40* (2013.01); *H01M 50/20* (2021.01); *H01M 2220/20* (2013.01)

(58) Field of Classification Search
CPC ........... B62M 6/90; B62M 6/80; B62K 19/40; H01M 50/20; H01M 2220/20
See application file for complete search history.

(56) References Cited

U.S. PATENT DOCUMENTS

| | | | |
|---|---|---|---|
| 7,393,125 B1 * | 7/2008 | Lai .......................... | B62K 19/30 362/473 |
| 8,382,128 B2 * | 2/2013 | Henksmeier .......... | B60B 35/006 280/86.758 |
| 8,413,947 B2 * | 4/2013 | Chiang .................... | B62M 6/90 248/553 |
| 8,651,212 B2 * | 2/2014 | Vincenz ................. | B62H 5/001 180/205.1 |
| 8,979,110 B2 * | 3/2015 | Talavasek ................ | B62M 6/90 280/279 |
| 9,580,141 B2 * | 2/2017 | Talavasek ................ | B62M 6/90 |
| 9,616,966 B2 * | 4/2017 | Talavasek ............... | B62K 19/34 |
| 9,950,602 B2 * | 4/2018 | Duan ........................ | B62M 6/90 |
| 9,969,455 B2 * | 5/2018 | Kwag ...................... | B60L 50/66 |

(Continued)

FOREIGN PATENT DOCUMENTS

| | | |
|---|---|---|
| CN | 107672723 A | 2/2018 |
| DE | 102014202946 A | 8/2014 |

(Continued)

*Primary Examiner* — Tony H Winner
*Assistant Examiner* — Michael R Stabley
(74) *Attorney, Agent, or Firm* — Perry + Currier Inc.

(57) ABSTRACT

A battery unit for a drive mechanism for a bicycle comprises at least one decoupling element. This allows for a decoupling of a housing for receiving a battery from the bicycle frame. The battery unit may in particular be mounted in an elastically dampened manner in the bicycle frame.

19 Claims, 11 Drawing Sheets

(56) References Cited

U.S. PATENT DOCUMENTS

| | | | |
|---|---|---|---|
| 10,906,609 B2 * | 2/2021 | Talavasek | B62K 25/02 |
| 11,124,259 B2 * | 9/2021 | Talavasek | B62J 43/28 |
| 2006/0110238 A1 * | 5/2006 | Tsukui | F16B 43/00 |
| | | | 411/536 |
| 2017/0190243 A1 | 7/2017 | Duan et al. | |
| 2018/0001785 A1 | 1/2018 | Shimoda et al. | |
| 2018/0006278 A1 * | 1/2018 | Shimoda | B62M 6/90 |
| 2018/0072378 A1 * | 3/2018 | Talavasek | B62M 9/00 |
| 2018/0072379 A1 * | 3/2018 | Talavasek | B62M 6/90 |
| 2018/0072380 A1 * | 3/2018 | Talavasek | B62M 9/00 |
| 2018/0269439 A1 * | 9/2018 | Yoneda | H01M 50/20 |
| 2019/0229307 A1 * | 7/2019 | Mitsu | B62M 6/90 |

FOREIGN PATENT DOCUMENTS

| | | |
|---|---|---|
| DE | 102017005808 A1 | 1/2018 |
| DE | 102018200891 A1 | 7/2018 |
| EP | 2871125 A1 | 5/2015 |
| EP | 3109146 A2 | 12/2016 |
| JP | 3137316-82 | 2/2001 |

* cited by examiner

BATTERY UNIT, SET WITH A BATTERY UNIT AND A RECEPTACLE DEVICE FOR RECEIVING THE BATTERY UNIT AND BICYCLE FRAME WITH SUCH SET

CROSS-REFERENCE TO RELATED APPLICATIONS

This application claims the priority of German Patent Application, Serial No. DE 10 2018 206 821.6, filed on May 3, 2018, pursuant to 35 U.S.C. 119(a)-(d), the content of which is incorporated herein by reference in its entirety as if fully set forth herein.

FIELD OF THE INVENTION

The invention relates to a battery unit for a drive mechanism for a bicycle. Furthermore, the invention relates to a set with a battery unit and a receptacle device for receiving the battery unit. Finally, the invention relates to a bicycle frame with such a set.

BACKGROUND OF THE INVENTION

There are different variants of bicycles with electric motors. In case of such bicycles, usually, a battery is mounted to the bicycle.

From EP 3 109 146 A2, a bicycle frame for supporting a battery is known, wherein the battery serves for driving an electric motor. Different fixing concepts for a bicycle battery unit are known from DE 10 2018 200 891 A1.

SUMMARY OF THE INVENTION

An object of the invention is to improve a battery unit for a drive mechanism for a bicycle.

This object is achieved by a battery unit for a drive mechanism for a bicycle comprising at least one battery, a housing for receiving the at least one battery with at least one receptacle element for receiving at least one supporting element for mounting the battery unit in or on a bicycle frame and at least one decoupling element interacting with the receptacle element for at least partially mechanically decoupling the supporting element incorporated in the receptacle element from the housing, wherein the at least one decoupling element comprises a slide-in shaft, which is stuck through the at least one receptacle element, and wherein the at least one decoupling element comprises at least one elastic and/or flexible component, by means of which the slide-in shaft is held in the receptacle element.

The decoupling element, in particular, allows for decoupling the battery unit from strains acting onto the frame of the bicycle.

According to an aspect of the invention, the at least one decoupling element comprises a slide-in shaft, which is stuck through the at least one receptacle element.

The slide-in shaft may, in particular, be made of aluminum.

Preferably, the axis is displaceable along its axial direction. This allows for a floating bearing of the housing of the battery unit on the slide-in shaft.

The decoupling element can be configured in one part or in several parts. In the following, also the variant of a multi-piece configuration of the decoupling element will be named as decoupling element instead of decoupling device.

According to another aspect of the invention, the at least one decoupling element comprises at least one elastic and/or flexible component, by means of which the slide-in shaft is held in the receptacle element.

Due to the elasticity and/or flexibility of this component, an at least partial mechanic decoupling of the slide-in shaft from the housing of the battery unit is made possible. By this means, in particular, it is possible to decouple forces, in particular torsional forces, which act onto the frame of the bicycle, from the housing of the battery unit.

The elastic and/or flexible component further allows for a dampened bearing of the housing of the battery unit. By this means, the electric/electronic components are protected. This leads to better durability.

The elastic and/or flexible component may in particular be configured as a reducing sleeve, which is inserted in the at least one receptacle element. The reducing sleeve may be configured in one part or in several parts. In particular, two reducing sleeves can be provided, which are inserted from opposite sides into the recess.

Preferably, the reducing sleeves may show an abutment shoulder, respectively, which abuts on the receptacle element from the outside.

The reducing sleeves, in the area to be inserted into the receptacle element, have an outer diameter which precisely corresponds to the inner diameter of the receptacle element. In particular, the can abut on the receptacle element with positive locking.

The reducing sleeve allows for supporting the slide-in shaft in the receptacle element. The slide-in shaft may, in particular, be held in a frictionally engaged manner in the receptacle element. In doing so, it may be displaceable along the axial direction.

According to an advantageous aspect of the invention, the slide-in shaft may be arranged in an inclinable manner in the receptacle element due to the elasticity and/or flexibility of the component of the decoupling element. In this context, even a very small inclinability area is enough to reduce the strain to the housing of the battery unit remarkably. Due to the inclinability, in particular, it is possible to reduce, in particular—at least to greatest extent—eliminate, the transfer of torsional forces from the bicycle frame to the housing of the battery unit.

According to another aspect of the invention, a second receptacle element can be provided on the housing in order to receive a further supporting element for mounting the battery unit in or on a bicycle frame.

The second receptacle element may, in particular, be configured as an oblong hole. Preferably, it shows an extension parallel to the longitudinal direction of the battery unit. The oblong hole configures a second decoupling element. In particular, it allows for tolerances in the longitudinal direction of the battery unit.

According to an aspect of the invention, the battery unit has at least two decoupling elements, wherein one of the decoupling elements leads to a decoupling or tolerance in the longitudinal direction of the battery unit, and wherein at least another one of the decoupling elements leads to a decoupling or tolerance in cross direction and/or against twists around the longitudinal axis.

One or several decoupling elements, in particular, allow for a floating bearing of the battery unit, in particular a decoupling of the housing of the battery unit from the bicycle frame.

According to another aspect of the invention, the slide-in shaft is configured as a hollow axle.

In particular, it configures a recess for a supporting element, by means of which it can be mounted in or on the bicycle frame.

According to a further aspect of the invention, the slide-in shaft, in its axial direction, has a play relative to the housing of the battery unit.

According to another aspect of the invention, the length of the slide-in shaft is adaptable in a way that it has no play relative to the bicycle frame in axial direction.

According to yet another aspect of the invention, the slide-in shaft has a threaded portion on at least one end. It may also have a threaded portion, respectively, on both ends. This may be a male thread for screwing on a contact element.

The slide-in shaft, in particular in the area of one of its ends, may show a contact surface, in particular in the form of a screw head, in particular in the form of a hexagon screw. In this case, preferably on the opposite end, it shows a male threaded portion, onto which a contact element in the form of a hexagon nut can be screwed. With the help of the male thread it is possible to screw the contact element onto the slide-in shaft at different positions. By this means, the effective length of the slide-in shaft is adaptable. The length of the slide-in shaft may, in particular, be adaptable in a way that it abuts, on both sides from the inside, on a contact surface, provided for this purpose, in the bicycle frame or a special receptacle device.

According to an alternative, the slide-in shaft has a female thread on both sides for receiving a supporting element, in particular in the form of a screw. This allows for a direct mounting of the slide-in shaft in or on the receptacle device or a bicycle frame.

According to another aspect of the invention, the slide-in shaft is configured in several parts, wherein one part with a threaded portion is connected with a further part via a plug connection.

This leads to the fact that the slide-in shaft has a variable length. By this means, the forces acting onto the bicycle frame or the receptacle device can be reduced.

According to a further aspect of the invention, the at least one receptacle element is reversibly mounted to the housing of the battery unit from the outside. Preferably, both receptacle elements are reversibly mounted to the housing of the battery unit from the outside. Preferably, the receptacle elements is/are replaceable.

The replacement element/s is/are, in particular, screwed to the housing of the battery unit. They may, in particular, each be screwed by means of four screws, in particular in the form of Allen head screws or torx screws, to the housing of the battery unit. This allows for a secure, exchangeable connection of the receptacle elements with the housing of the battery unit.

According to yet another aspect of the invention, the battery unit has a cover for closing the receptacle device, wherein the cover is reversibly mountable to the housing.

By means of the cover, in particular an opening, through which the battery unit can be inserted into the receptacle device and/or the bicycle frame, can be closed reliably, in particular in a tight manner, in particular in a water-tight manner.

In particular, a plate made of metal, plastic material or fiber composites, may be provided as a cover.

Preferably, the cover is screwed to the housing of the battery unit.

According to a further aspect of the invention, the cover is mounted in a guided manner in a groove configured on the housing of the battery unit. The cover may, in particular, be slid onto the housing of the battery unit and be fixed thereto by means of screws.

Preferably, the cover is exchangeable.

According to another aspect of the invention, the cover is configured as a profile element. It may, in particular, have a U-shaped cross section. Preferably, it may be configured as a plate with laterally projecting limbs.

It is another object of the invention to improve the assembly of a battery unit for a drive mechanism for a bicycle on the bicycle.

This object is achieved by a set with a battery unit according to the present invention and a holing device for receiving the battery unit.

It is the core of the invention to mount the battery unit in a floating manner in the receptacle device.

By this means, strains to the housing of the battery unit are reduced.

According to an aspect of the invention, it is possible to fix the battery unit reversibly in the receptacle device by means of two through bolts.

This allows for an especially simple and secure fixation of the battery unit in the receptacle device.

Preferably, the battery unit is mounted floatingly in the receptacle device, in particular in the bicycle frame. This is to be understood such that the battery unit may shift and/or twist relative to the receptacle device, in particular relative to the frame of the bicycle. The maximum range of motion of the battery unit, in this context, may be very small. However, it corresponds to the extent of the maximum deformability of the part of the bicycle frame into which the battery unit is inserted. In particular, it corresponds to the maximum deformability of the down tube of the bicycle frame during normal use of the bicycle, in particular during downhill application. In particular, this leads to the effect that a transmission of torsional forces from the frame to the housing of the battery unit is reduced, in particular avoided.

The receptacle device is integrated, in particular, in the bicycle frame, for example in the down tube, in the seat tube or in the top tube. It may, in particular be firmly attached to the bicycle frame and be configured with same in one part. In particular, the receptacle device has an insertion opening, through which the battery unit can be inserted.

According to an aspect of the invention, the at least one through bolt, in particular both through bolts, have a threaded portion.

The through bolts may, in particular, be screws.

According to another aspect of the invention, a threaded portion compatible hereto is provided in the receptacle device. The through bolt/s may, in particular, be screwable into the receptacle device. It may also be provided to integrate a nut compatible to the threaded portion of the through bolt/s into the bicycle frame.

According to an alternative, the through bolts are fixed by means of a separate nut.

The through bolts can be stuck through a push-through opening, respectively, of a housing of the battery unit. They may also be screwed to the battery unit.

The through bolts can be stuck through one or two push-through openings, respectively, of the receptacle device. They may also be screwed to the receptacle device.

The through bolts entirely penetrate in particular at least one opening, respectively, in the receptacle device and/or the battery unit, in particular a housing thereof. Advantageously, at least one of these openings in the receptacle device and/or the battery unit is configured as an oblong hole. Thus, a tolerance compensation can be ensured.

The through bolts may show a conical area, respectively, in particular a conical head, This may be used for a centering clamping of the battery unit in the receptacle device.

According to a further aspect of the invention, at least one component of the battery unit can be mounted without play in the receptacle device. In particular, it is possible to mount the slide-in shaft without play in the receptacle device.

By this means, in particular, an undesired rattling of the battery unit in the receptacle device can be avoided.

According to another aspect of the invention, the battery unit can be inserted by means of a guide, in particular a sliding block guide, into the receptacle device. It may be inserted in particular angularly, in particular at an angle in the range of 10° to 60°, in particular in the range of less than 45°, to the longitudinal axis of a frame tube in which the receptacle device is arranged. In particular, the battery unit has a cover plate for this purpose.

The cover plate, advantageously, is configured in one part with the housing of the battery unit.

According to yet another aspect of the invention, the cover plate may be configured in a way that it can be mounted, in particular screwed or plugged, to the housing of the battery unit.

According to a further aspect of the invention, the receptacle device is configured in a liquid-tight manner. It may, in particular, be closeable in a liquid-tight manner by means of the battery unit. Advantageously, on the inner side of the cover plate directed towards the receptacle device, an elastic sealing lip is arranged, which upon insertion of the battery unit into the receptacle device closes same in a liquid-tight manner.

According to another aspect of the invention, at least one further, separate fixing and/or clamping means for fixing and/or clamping of the battery unit in the receptacle device is provided. Thus, the fit of the battery unit in the receptacle device can be further improved.

According to yet another aspect of the invention, the battery unit can be mounted without any tools in the receptacle device. It can, in particular, be inserted manually reversibly into the receptacle device. It can, in particular, be removed from the receptacle device without any tools.

Alternatively, it may be advantageous to configure the battery unit and/or the receptacle device in a way that the battery unit can be removed from the receptacle device only with the help of a special tool. It may, in particular, be arranged in a closeable manner in the receptacle device. For removing the battery unit from the receptacle device, a special key is necessary in this case. This provides protection against undesired removal of the battery unit from the receptacle device, in particular protection against theft.

A further object of the invention is to improve a bicycle frame.

This object is achieved by a bicycle frame with a set according to the foregoing description.

The advantages follow from the description given above.

The object is achieved, in particular, by a bicycle frame with a receptacle device for receiving a battery unit for a drive mechanism, wherein the receptacle device shows a first and a second supporting or fixing element for fixing at least one component of the battery unit, wherein the first supporting or fixing element is configured in a way that it allows for a rotatory or a linear insertion of the battery unit into the receptacle device and wherein the second supporting or fixing element is configured in a way that it allows for a detachable mounting of at least one component of the battery unit, in particular its slide-in shaft, in the receptacle device.

The two fixing elements are spaced at a distance d from each other in a longitudinal direction of the receptacle device. The distance d, in particular, lies within the range of 5 cm to 50 cm, in particular in the range of 10 cm to 40 cm.

By means of the receptacle device, a preset end position for the battery unit is defined. This identifies the position of the battery unit at entirely inserted, in particular fixed, state in the receptacle device.

According to an aspect of the invention, the end position can be adjusted. It can, in particular, be adjusted with the help of one or both fixing elements.

According to another aspect of the invention, the receptacle device is entirely integrated in a tube of the bicycle frame. It can, in particular, be integrated in the down tube, in the top tube or in the seat tube of the bicycle frame.

The receptacle device can, in particular, configure a component of the bicycle frame.

It can, in particular, be integrated in the down tube of the bicycle frame such that the battery unit can be inserted from below into the receptacle device. The top side of the down tube can thus be used without modification for attachment parts, for example a bottle holder, or for the linkage of spring-loaded chainstays of the bicycle.

According to yet another aspect of the invention, the receptacle device and/or the battery unit, in particular its housing, are configured in a way that they contribute to a strengthening, in particular to a stiffening, in particular in lateral direction, of the bicycle frame in this area. They can, in particular, show profiled elements, which extend in longitudinal direction.

According to a further aspect of the invention, the battery unit, in particular its housing, is configured in a way that a reduction of the forces transferred from the bicycle frame to the battery housing results. Advantageously, for this purpose, the housing shows elastic intermediate elements on contact surfaces with the fixing elements, which dampen the forces acting in the bicycle frame. In particular, the intermediate elements are configured of rubber. A configuration of the intermediate elements out of different materials, which also show a dampening function, is conceivable, as well.

According to another aspect of the invention, the battery unit can be entirely integrated into the bicycle frame. The battery unit, in particular, can be configured in a way that the contour of the respective frame tube, in particular of the areas adjacent to the receptacle device, is completed by the surface of the battery unit when same is in the inserted state. The contour of the respective frame tube can be completed, in particular by positive locking, essentially edgeless, by the surface of the battery unit, in particular its housing.

According to yet another aspect of the invention, the receptacle device and the battery unit are configured—at least in certain areas—in a complementary manner to one another. The receptacle device can, in particular, configure a positively locking fit for the battery unit.

The receptacle device, in particular, has an inner cross section. The battery unit, in particular, has an outer cross section. Here, the inner cross section of the receptacle device and the outer cross section of the battery unit are, in particular, adapted to one another in a way that they configure several contact surfaces.

According to a further aspect of the invention, the battery unit and/or the receptacle device has a cross section varying in longitudinal direction. In particular, it is possible to configure pin- or rib-like projections on one of the two elements, which interact with corresponding recesses, in particular grooves. In this manner, the fit of the battery unit in the receptacle device and thus in the bicycle frame can be further improved. The battery unit can thus, in particular upon fixation, be additionally guided along a sliding rail and additionally clamped thereto.

According to a particularly advantageous embodiment, the grooves can be configured in a way that the battery unit is brought into an over dead center position upon insertion into the receptacle device. By this means, the danger of an undesired dropping out of the battery unit from the receptacle device can be further reduced. Preferably, the battery unit is pressed into its end position in the receptacle device, in this case, by means of one or several elastic means According to another aspect of the invention, the first fixing element and/or the second fixing element is configured in a way that it allows for a mounting of the battery unit without play in the receptacle device.

It can, in particular interact with the battery unit by positive locking. It can also interact in a clamping matter with the battery unit.

According to yet another aspect of the invention, the second fixing element of the receptacle device shows a selection from the following list: a toggle joint, in particular a toggle joint with an over dead center position, an eccentric screw, which is in particular configured as a spiral eccentric screw, a clamping plate, a clamping lever, which clamps the housing of the battery unit axially to the swivel axis of the clamping lever, a locking mechanism, one or several magnets.

According to a further aspect of the invention, at least one additional fixing means for fixing the battery unit in the receptacle device is provided. The additional fixing means in particular serves for fixing the battery unit in the position entirely inserted in the receptacle device.

As a fixing means, for example, a screw, in particular a clamping screw, may be provided. With the help of the clamping screw, the battery unit can be clamped in the bicycle frame and/or in the receptacle device. The clamping screw may, as well, interact with one of the fixing elements.

A wedge, an eccentric screw, a toggle joint, in particular a toggle joint with an over dead center position, or another fixing means may serve as a fixing means, as well.

The additional fixing means can be independent from the fixing elements of the receptacle device, in particular interact independently from these with the battery unit. The additional fixing means can also interact with one or both of the fixing elements of the receptacle device.

According to another aspect of the invention, an elastic means is provided, which is arranged between the receptacle device and the battery unit in the state of the battery unit entirely inserted in the receptacle device. In this state, in particular, it abuts on both of them. In this state, it is in particular slightly compressed. By this means, a force is exerted to the battery unit. This leads to a particularly secure, vibration-free fit of the battery unit in the receptacle device.

It may, in particular, be provided to line an area of the receptacle device with a layer of an elastic material. This may also serve for tolerance compensation.

According to yet another aspect of the invention, the first fixing element of the receptacle device is configured for interacting with a complementary element on the battery unit. One of these elements, in particular, is configured as an axis.

The other element can be configured in a forked manner, i.e. with a C-shaped cross section, in a pin-shaped manner, a jaw-shaped manner or as a suspension flap. Here, in particular the clear span of the reception area can be adjustable, in particular with the help of a clamping screw.

The axis may extend across the entire width of receptacle device. Alternatively, bolt-like projections may be provided on opposite sides of the receptacle device. With the help of a continuous axis, the transverse rigidity of the receptacle device can be increased. For the sake of weight reduction, the axis can be configured as a hollow axle. Corresponding bolt-like projections may, as well, be configured in the area of a second fixing element on the opposite sides of the receptacle device.

The axis can also be provided with a threaded portion. This may be used for an axial clamping of the battery unit in the receptacle device.

According to a further aspect of the invention, at least one component of the axis is rotatable relative to the receptacle device.

The axis may also have an at least partially eccentric cross section. This may be used for clamping and/or fixing the battery unit in the receptacle device, as well.

According to another aspect of the invention, at least one of the fixing elements of the receptacle device, in particular both of them, is detachably connected with the bicycle frame.

The fixing elements can, in particular, be configured as through bolts.

They can have a threaded portion. The associated complementary threaded portion can, preferably, be integrated in the receptacle device. Alternatively, a separate nut for fixing the fixing elements may be provided.

According to yet another aspect of the invention, at least one of the fixing elements has a conic portion, in particular a conically shaped head. This may lead to self-centering fixation of the fixing element and thus of the battery unit in the receptacle device.

The through bolt, in particular, is passed through at least one push-through opening in the battery unit, in particular its housing. It may also be passed through one or two or more push-through openings in the receptacle device and/or the bicycle frame. The through bolt may be directly screwed into the threaded portion in the receptacle device or in the bicycle frame, as well.

Preferably, the through bolt is configured in a way that, in entirely inserted state, it does not protrude beyond the outer contour of the respective tube of the bicycle frame. It may be covered by means of a cover cap, in particular of plastic material or rubber.

According to a further aspect of the invention, the slide-in shaft of the battery unit is detachably fixed by means of a through bolt in the bicycle frame.

This allows for the battery unit to be arranged floatingly, however vibration-free, in the bicycle frame.

According to another aspect of the invention, the battery unit is mounted in an elastically dampened manner in the bicycle frame.

This, in particular, is allowed for by one or more elastic and/or flexible components of the decoupling element.

An elastically dampened mounting of the battery unit increases its service life.

In the following, further advantageous aspects of the battery unit will be described.

The battery unit is, in particular entirely, integrable into a receptacle device in the bicycle frame. In this regard, reference is made to the foregoing description.

With the help of the housing of the battery unit, the receptacle device can be closed to the outside, in particular sealed, in particular sealed in a liquid-tight manner. For this purpose, a cover plate, in particular with an elastic sealing lip, may be provided on the housing. At the same time, this serves for ensuring a secure, rattle-free fit of the battery unit in the receptacle device.

The battery unit comprises, in particular, a plurality of batteries. These batteries, preferably, are arranged laterally to the longitudinal direction of the battery unit. The battery unit has a total capacity in the range of 400 to 1000 Wh.

In the housing of the battery unit, a charger connection can be provided. In particular, the charger connection can be configured in a multipolar, in particular two- to six-pole, advantageously four-pole, manner. Advantageously, the charger connection is configured in a water-tight manner. The charger connection may, in particular, be a USB port.

According to yet another aspect of the invention, the battery unit can be charged without any contact, in particular inductively.

According to a further aspect of the invention, the battery unit is provided with a lock. This allows for securing the battery unit against unauthorized removal of from the receptacle device.

Further details and particulars of the invention as well as its advantages follow from the description of several alternatives with reference to the figures.

DESCRIPTION OF THE PREFERRED EMBODIMENT

Figure 1:
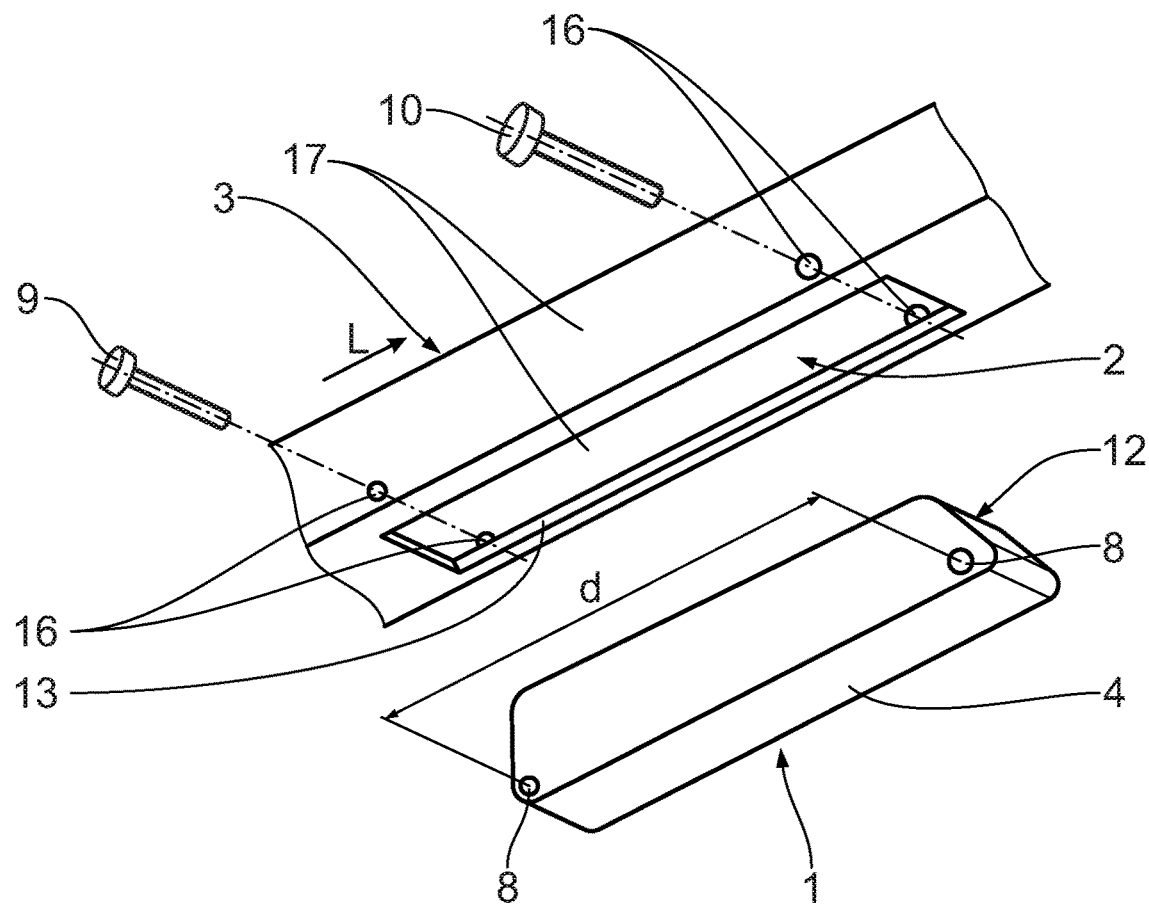
FIG. 1 shows a perspective view of a detail of a bicycle frame with a receptacle for a battery unit before the insertion of the battery unit into the receptacle.
Figure 2:
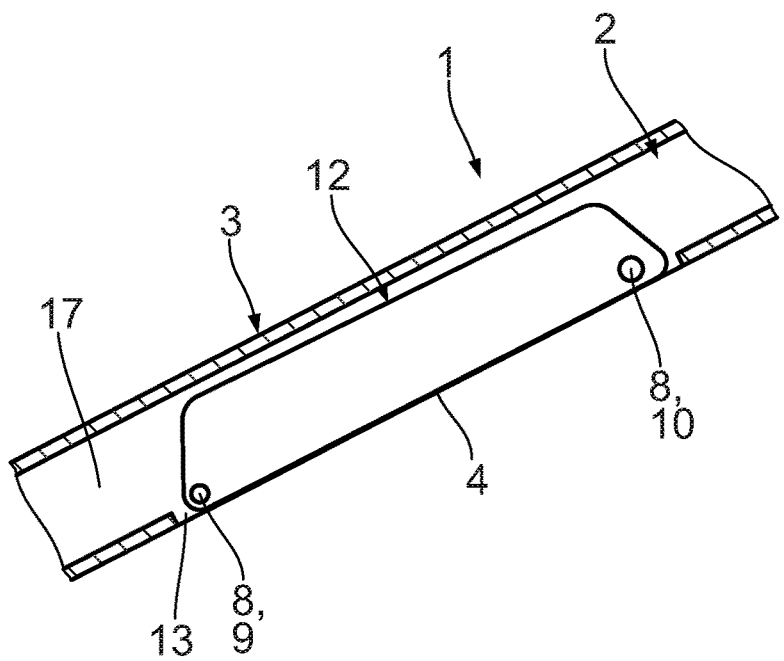
FIG. 2 shows a section through the bicycle frame and the battery unit along the longitudinal axis of the bicycle frame according to FIG. 1 after insertion of the battery unit into the receptacle device.
Figure 3:
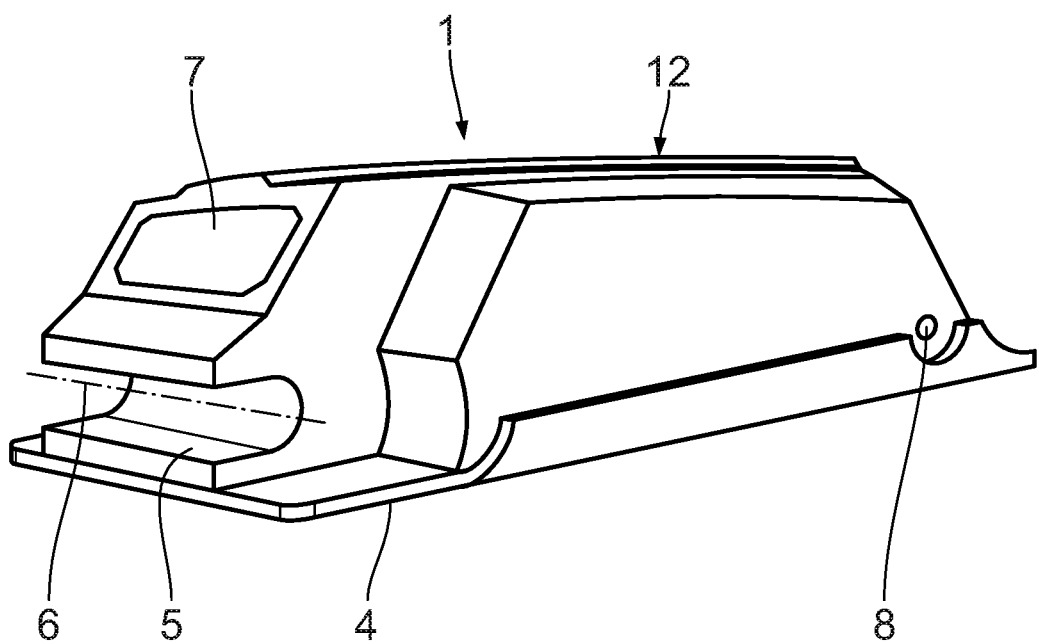
FIG. 3 shows a perspective view of a battery unit according to an alternative.
Figure 4:
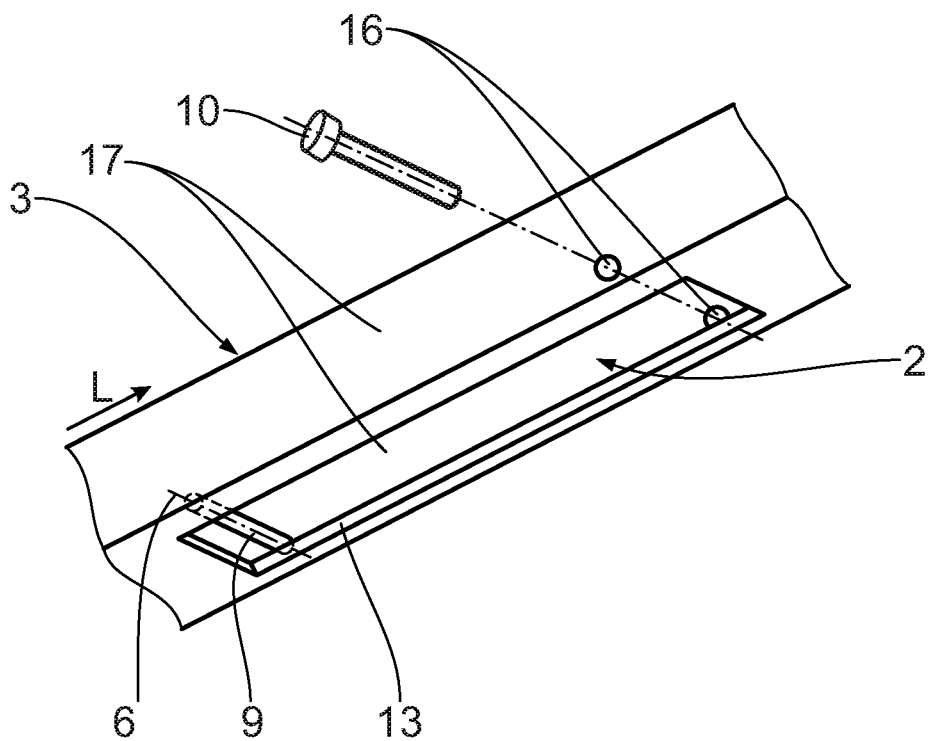
FIG. 4 shows a perspective view of a bicycle frame according to an alternative.
Figure 5:
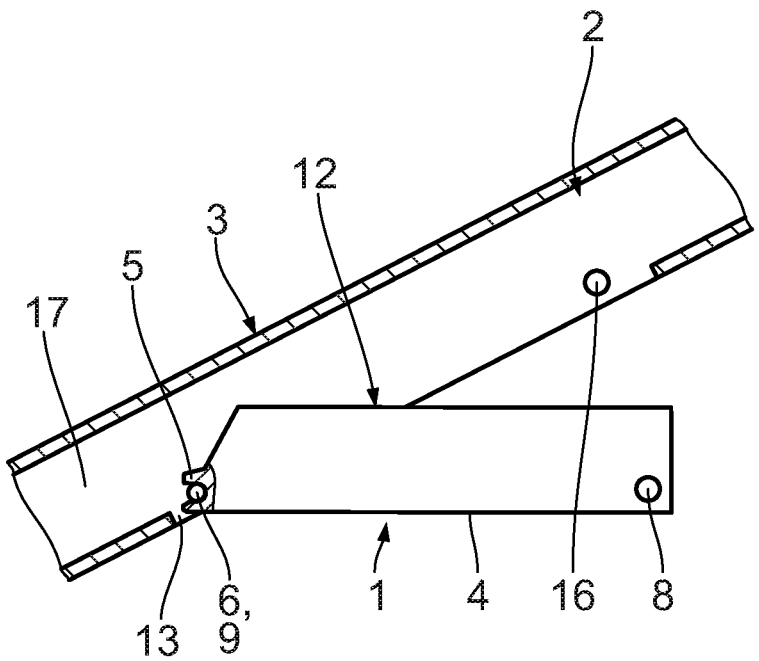
FIG. 5 shows a section through the bicycle frame and the battery unit along the longitudinal axis of the bicycle frame according to FIG. 4 upon insertion of the battery unit into the receptacle.
Figure 6:
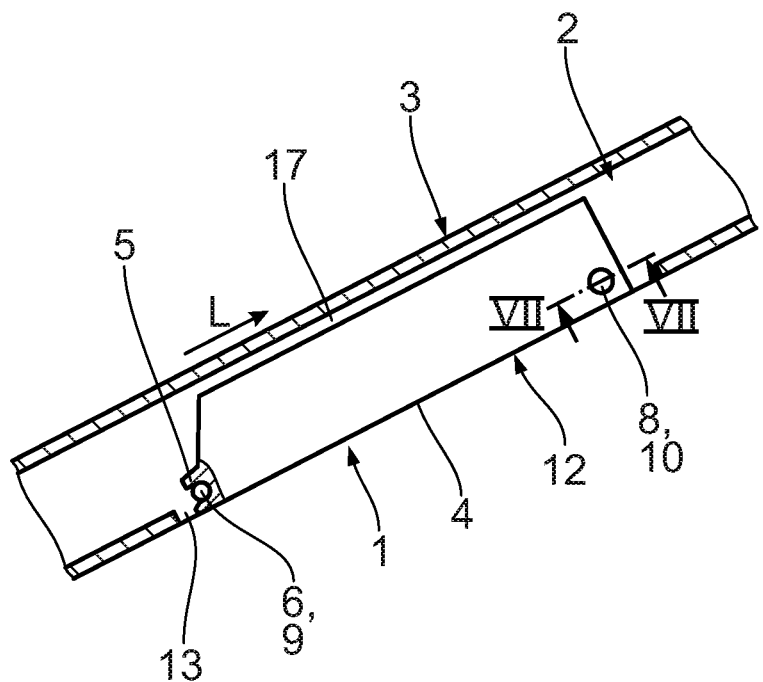
FIG. 6 shows a section through the bicycle frame and the battery unit along the longitudinal axis of the bicycle frame according to FIG. 4 after the insertion of the battery unit into the receptacle.
Figure 7:
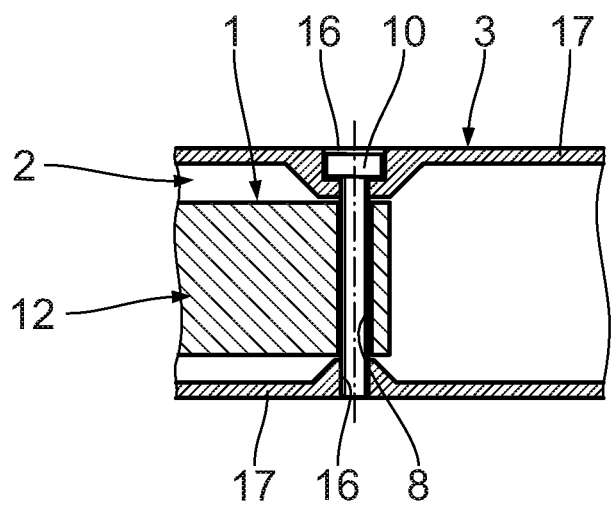
FIG. 7 shows an enlarged sectional view of a second fixing element along the line VII-VII from FIG. 6, wherein the section shows the mounting of the battery unit onto the bicycle frame by the second fixing element.

The FIGS. 1 and 2 show a set comprising a battery unit 1 and a receptacle device 2 for receiving the battery unit 1.

The receptacle device 2 is integrated into a down tube of a bicycle frame 3 and has an insertion opening 13 on the downside thereof, through which the battery unit 1 is inserted into the receptacle device 2. According to the variant shown, the receptacle device 2 is configured in one part with the down tube of the bicycle frame 3.

The battery unit 1 comprises a housing 12 and a cover plate 4, wherein the cover plate 4 is configured in one part with the housing 12 of the battery unit 1. The housing 12 serves for receiving at least one, in particular a plurality of batteries 21. The batteries 21 are only shown in the FIGS. 18 and 19 for the sake of clarity. By means of the cover plate 4, the receptacle device 2 is closeable in a liquid-tight manner after or upon insertion of the battery unit 1. For this purpose, an elastic sealing lip, which is not shown, is arranged on the inner side of the cover plate 4 facing the receptacle device 2.

Furthermore, the housing 12 of the battery unit 1 has two push-through openings 8, through which a first fixing element 9 and a second fixing element are passed in order to mount the battery unit 1 in the receptacle device 2. According to the variant shown, the fixing elements 9 and 10 are configured as through bolts. In this case, the lower push-through opening serves for receiving the first fixing element 9 and the upper push-through opening serves for receiving the second fixing element 10. The push-through openings 8 are configured across the entire width of the housing 12 of the battery unit 1 and are spaced from each other at a distance of d=30 cm in longitudinal direction along the housing 12.

On the receptacle device 2 and on the bicycle frame 3, side walls 17 are configured to the side of the insertion opening 13, which extend along the longitudinal direction L of the insertion opening 13. The side walls 17 have two receptacle openings 16, respectively, in which the first fixing element 9 as well as the second fixing element 10 are received. In doing so, the receptacle openings 16, are spaced at the distance d=30 cm from each other in the longitudinal direction L. The receptacle openings 16 serve for receiving the fixing elements 9 and 10 passed through the push-through openings 8.

By means of the receptacle device 2, a preset end position for the battery unit 1 inserted into the receptacle device 2 is defined, wherein the end position identifies the entire insertion of the battery unit 1 in the receptacle device 2. In this end position, the push-through openings 8 of the housing 12 and the receptacle device 2 or the bicycle frame 3, spaced in a longitudinal direction L, are arranged coaxially to one another. For mounting the battery unit 1 in the receptacle device 2, the first fixing element 9 as well as the second fixing element 10 are passed through the coaxially arranged push-through openings 8 and fixed by use of fixing means in the receptacle openings 16. For fixation, the receptacle openings 16 of a side wall show threads, in which the fixing elements 9 and 10, configured as through bolts, are screwed. The fixing elements 9 and 10, in their screwed-in state, i.e. when the battery unit 1 is in the end position, are configured in a planar manner with the outsides of the side walls 17.

Additionally, the battery unit 1 has a blade contact receptacle 7, by means of which a conductive connection with a drive mechanism can be established. For the sake of clarity, the conductive connection as well as the drive mechanism are not shown.

With reference to FIGS. 3 to 7, a battery unit 1 as well as a receptacle device 2 according to an alternative are described. Constructively similar components have the same reference numbers as in the FIGS. 1 and 2 above.

Here, the battery unit 1 has a complementary element 5 below the blade contact receptacle 7, by which means the battery unit 1 can be pivoted via a rotation axis 6. The first fixing element 9 of the receptacle device 2 is then configured in a way that the first fixing element 9 interacts with the complementary element 5 of the battery unit 1. The first fixing element 9 as well as the complementary element 5 are arranged coaxially to one another in the end position, by which means the battery unit 1 can be pivoted into the end position in the receptacle device 2.

Due to the fact that the complementary element 5 as well as the first fixing element 9 configure the same rotation axis 6, the battery unit 1 can be pivotably brought into the end position in the receptacle device 2. The battery unit 1 is fixed in the end position in the receptacle device 2 by means of the second fixing element 10. The second fixing element, in this case, is configured as a through bolt. From FIG. 7, it can be seen that the second fixing element, in mounted state, is configured in a planar manner with the side walls 17.

According to this alternative, the first fixing element 9 is configured as a pin, whereas the complementary element 5 is configured in a forked manner, i.e. with a C-shaped cross section. In this case, the pin is configured in one part with the receptacle device. However, it is also possible to configure the pin as a through bolt, which has been mounted in the receptacle device 2 via the receptacle openings 16 before.

Figure 8:
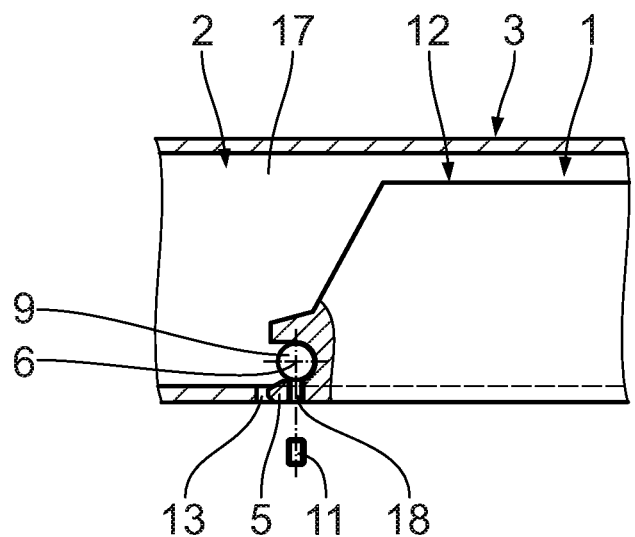
FIG. 8 shows an enlarged sectional view of a bicycle frame and a battery unit in the area of a first fixing element according to another alternative after the insertion of the battery unit into the receptacle device.

According to FIG. 8, another alternative of a set is described. Constructively similar components have the same reference numbers as in the FIGS. 1 to 7 above.

According to this alternative, the set shows an additional fixing means 11 for fixing the battery unit 1 in the receptacle device 2. The additional fixing means 11, in particular, serves for fixing the battery unit 1 in the end position. In the alternative shown, the fixing means 11 is configured as a clamping screw. It can be inserted into a threaded hole 18. The latter permeates the outer arm of the C-shaped cross section of the complementary element 5 entirely. By the threaded hole 18, the clamping screw, after insertion of the battery unit into the receptacle device 2, can be brought into operative connection with the first fixing element of the receptacle device 2. In doing so, the battery unit 1 is clamped in the bicycle frame 3 or in the receptacle device 2, by which means an especially tight fit of the battery unit 1 is ensured.

Figure 9:
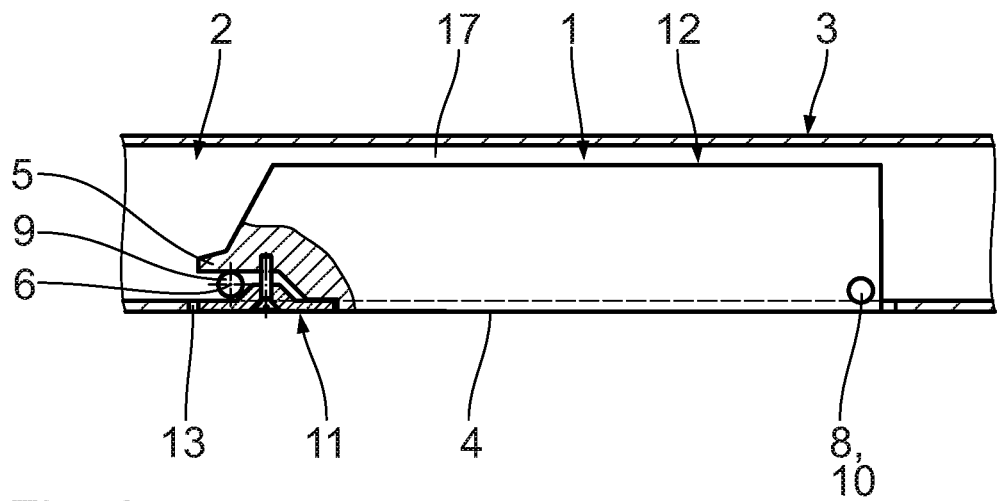
FIG. 9 shows a section through a bicycle frame and a battery unit along the longitudinal axis of the bicycle frame according to yet another alternative after the insertion of the battery unit into a receptacle device.

With reference to FIG. 9, yet another alternative of the set is described, wherein similar components have the same reference numbers as in the FIGS. 1 to 8 above.

In this alternative, the outer wing of the C-shaped complementary element is configured as a clamping plate. The clamping plate is a part of the fixing means 11. Additionally, the fixing means 11 comprises a screw, by means of which the clamping plate is mounted to the battery unit 1. The screw is configured in a way that, in entirely inserted state, it does not protrude beyond the outer contour of the clamping plate. The clamping plate as well as the cover plate 4 are configured in a planar manner in this case. In particular, an elastic sealing lip can be provided on the clamping plate, which ensures a rattle-free and liquid-tight mounting of the clamping plate to the battery unit 1.

Figure 10:
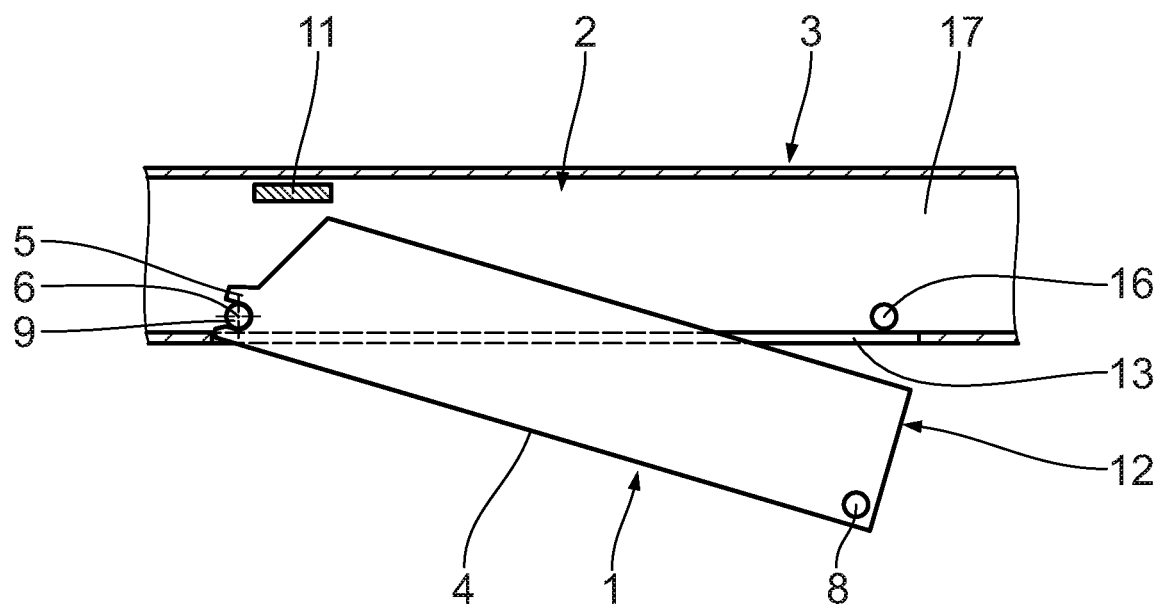
FIG. 10 shows a section through a bicycle frame and a battery unit along a longitudinal axis of the bicycle frame according to a further alternative before the insertion of the battery unit into a receptacle device.
Figure 11:
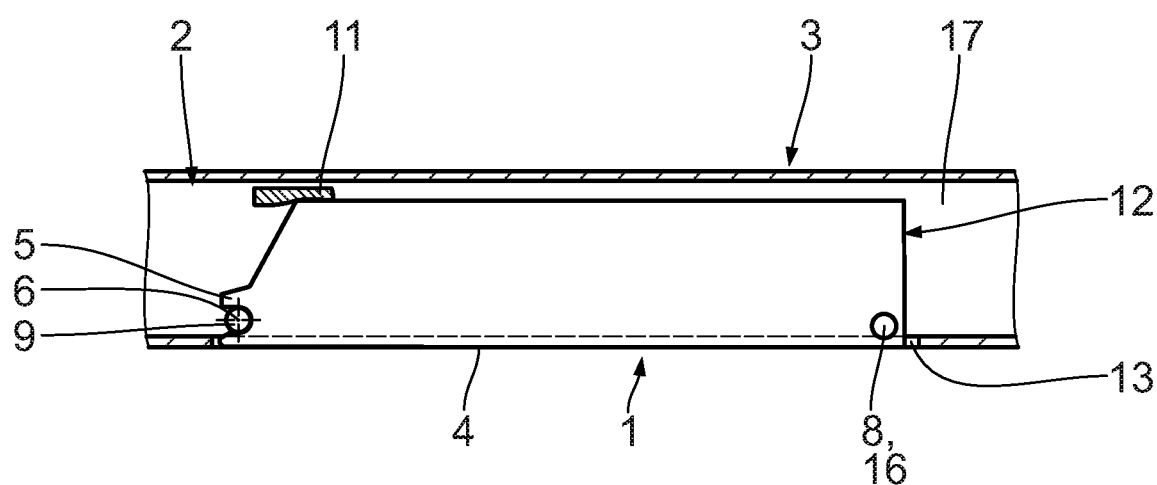
FIG. 11 shows a section through the bicycle frame and the battery unit along the longitudinal axis of the bicycle frame according to FIG. 10 after the insertion of the battery unit into the receptacle device.

With reference to FIGS. 10 and 11, a further alternative of a set is described. Constructively similar components have the same reference numbers as in the FIGS. 1 to 9 above.

According to this alternative, the additional fixing means 11 is configured as an elastic means. The elastic means, in this case, is arranged in the receptacle device 2 in a way that it is arranged between the receptacle device 2 and the battery unit 1 upon insertion of the battery unit 1 into the end position. In the end position, the elastic means is slightly compressed, by which means a secure and vibration-free fit of the battery unit 1 in the receptacle device 2 is ensured.

According to this alternative, the elastic means is an elastomer. However, configurations of rubber or a similarly elastically deformable material are conceivable, as well. It is also conceivable to configure the elastic means in the form of a spring.

The elastic means is arranged in the receptacle device 2 in a way that it rests in the area of the blade contact receptacle 7 in the end position of the battery unit 1. It is also conceivable that the elastic means is applied across the entire longitudinal direction of the receptacle device as well as of the battery unit 1 in the receptacle device 2. Moreover, it is conceivable that the additional fixing means is not applied in the receptacle device 2, but on the upper side of the housing 12 of the battery unit 1.

Figure 12:
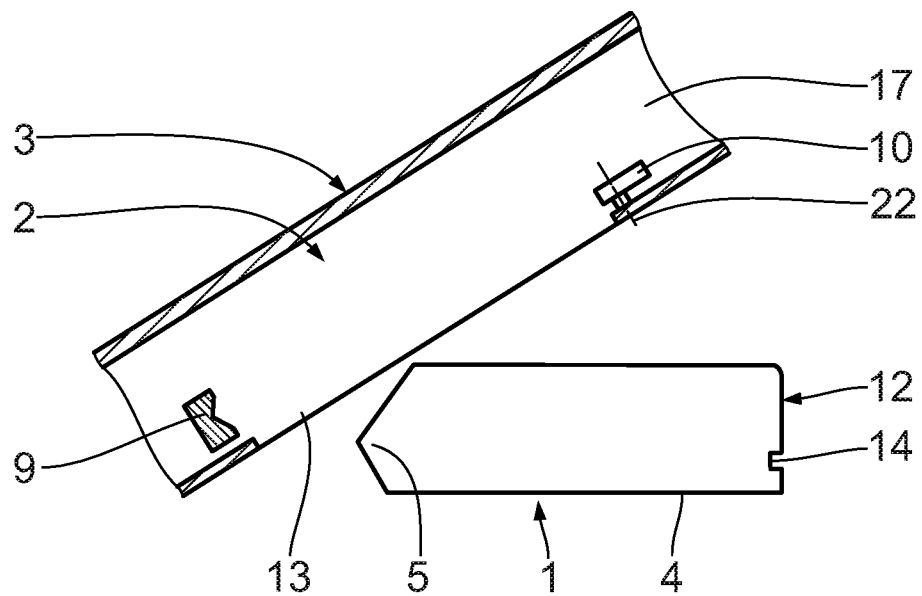
FIG. 12 shows a section through a bicycle frame and the battery unit along the longitudinal axis of the bicycle frame according to another alternative before the insertion of the battery unit into a receptacle device.
Figure 13:
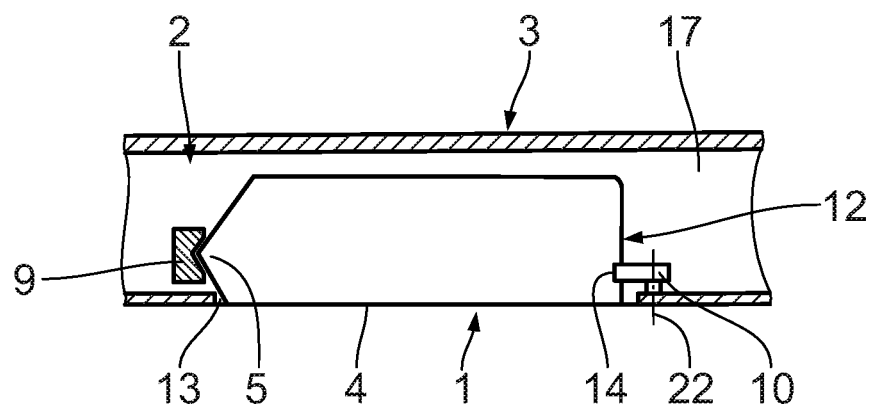
FIG. 13 shows a section through the bicycle frame and the battery unit along the longitudinal axis of the bicycle frame according to FIG. 12 after the insertion of the battery unit into the receptacle device.

With reference to FIGS. 12 and 13, another alternative of the set is described, wherein constructively similar components have the same reference numbers as in the FIGS. 1 to 11 above.

According to this alternative, the first fixing element 9 shows a V-shaped cross section, in which the complementary element 5 of the battery unit 1, shaped in a complementary manner, is inserted. On the side opposite to the complementary element 5, the battery unit 1 has a recess 14. The latter can be brought into operative connection with the second fixing element 10. The second fixing element 10, in this case, is configured as an eccentric clamping element. The eccentric clamping element can be twisted about a rotational axis 22 by means of an additional actuation lever (not shown), applicable to the clamping element, in a way that the clamping element can be inserted into the recess 14. Thus, the battery unit 1 can be fixed in the receptacle device 2.

Figure 14:
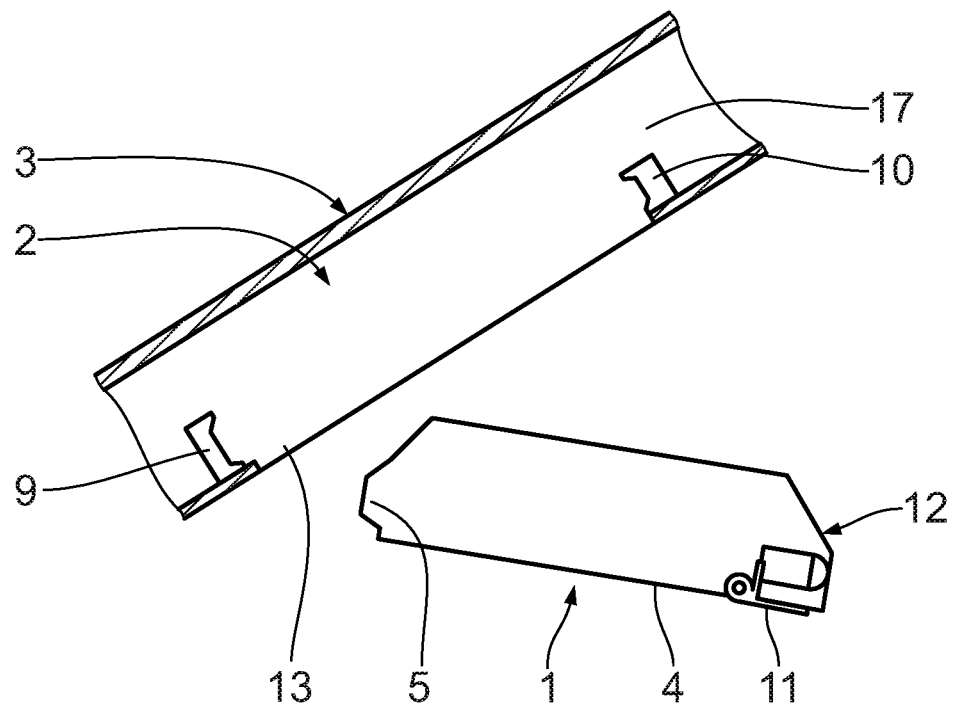
FIG. 14 shows a section through a bicycle frame and a battery unit along the longitudinal axis of the bicycle frame according to yet another alternative before the insertion of the battery unit into a receptacle device.
Figure 15:
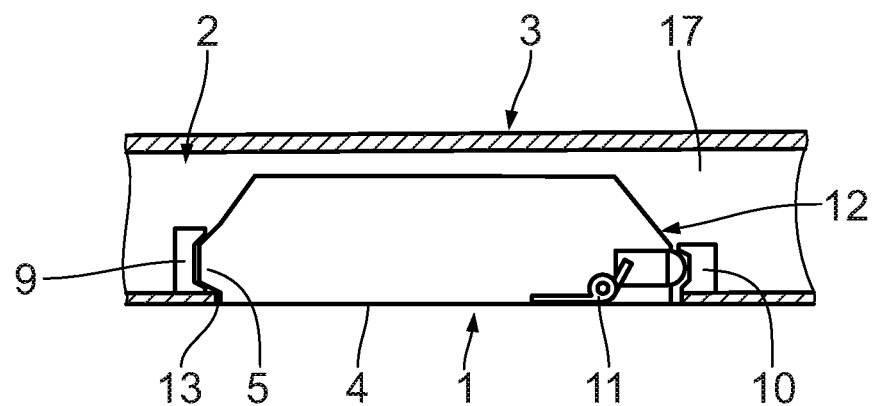
FIG. 15 shows a section through the bicycle frame and the battery unit along the longitudinal axis of the bicycle frame according to FIG. 14 after the insertion of the battery unit into the receptacle device.

In the FIGS. 14 and 15, yet another alternative of the set is shown. Constructively similar components have the same reference numbers as in the FIGS. 1 to 13.

According to this alternative, the first fixing element 9 has a rectangular cross section with a trapezoidal cut-out. Correspondingly, the battery unit 1 has a complementary element 5 with a trapezoidal extension in its cross section, which is configured in a complementary manner to the trapezoidal cut-out of the first fixing element 9 and can be inserted therein. On the side opposite to the complementary element 5, the battery unit 1 has an additional fixing means 11 in the form of a toggle joint, wherein by actuating a corresponding toggle, the joint is inserted into the second fixing element of the receptacle device 2 in a way that the battery unit 1 is fixed in the end position. The second fixing element, in this case, has a cross section in which the additional fixing means 11 is inserted upon actuation of the toggle.

Figure 16:
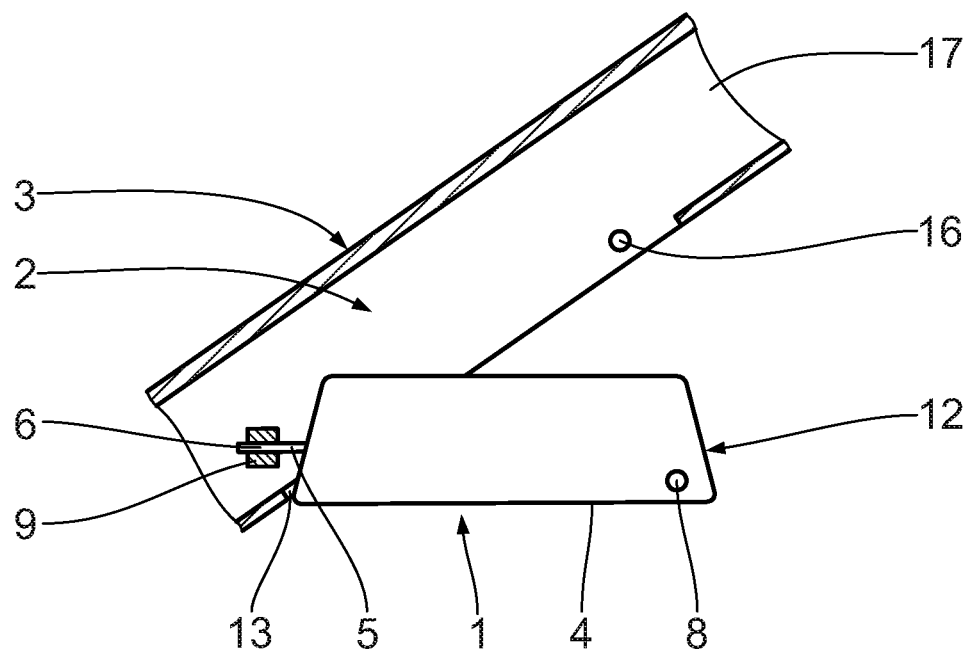
FIG. 16 shows a section through a bicycle frame and a battery unit along the longitudinal axis of the bicycle frame according to a further alternative before the insertion of the battery unit into a receptacle device.
Figure 17:
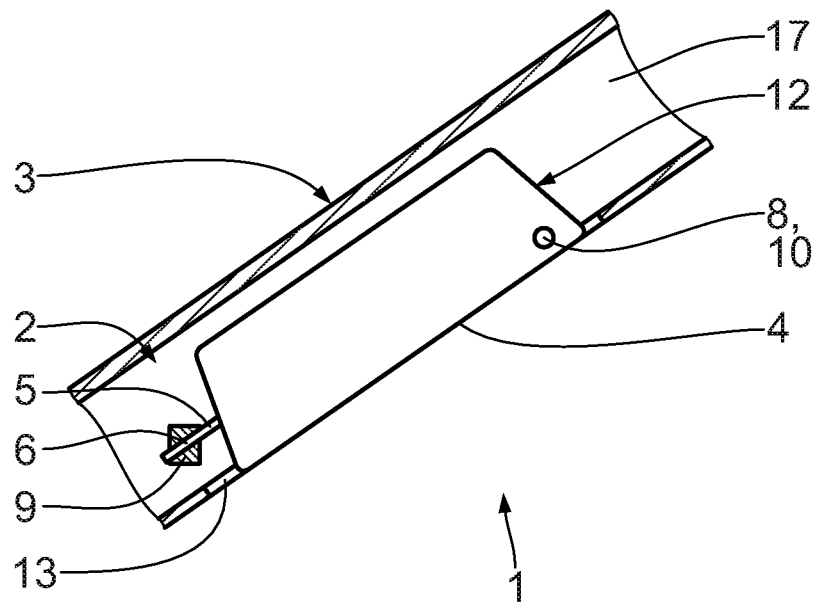
FIG. 17 shows a section through a bicycle frame and the battery unit along the longitudinal axis of the bicycle frame according to FIG. 16 after the insertion of the battery unit into the receptacle device.

With reference to the FIGS. 16 and 17, a further alternative of the set is described. Constructively similar components have the same reference numbers as in the FIGS. 1 to 15 above.

According to this alternative, the complementary element 5 is configured as a pin-shaped extension, which can be inserted into the first fixing element 9. For this purpose, the first fixing element shows an opening, through which the extension is passed. The first fixing element 9 is configured flexibly in a way that the battery unit 1 is pivotably mounted via the rotation axis 6 into the end position in the receptacle device 2. The fixation of the battery unit 1 is achieved by the second fixing element, which is configured as a through bolt in the alternative shown.

In particular, a plurality of pin-shaped extensions may be used as complementary elements 5, as well. The extensions may configure contact pins for establishing an electrically conductive connection with the drive mechanism.

Figure 18:
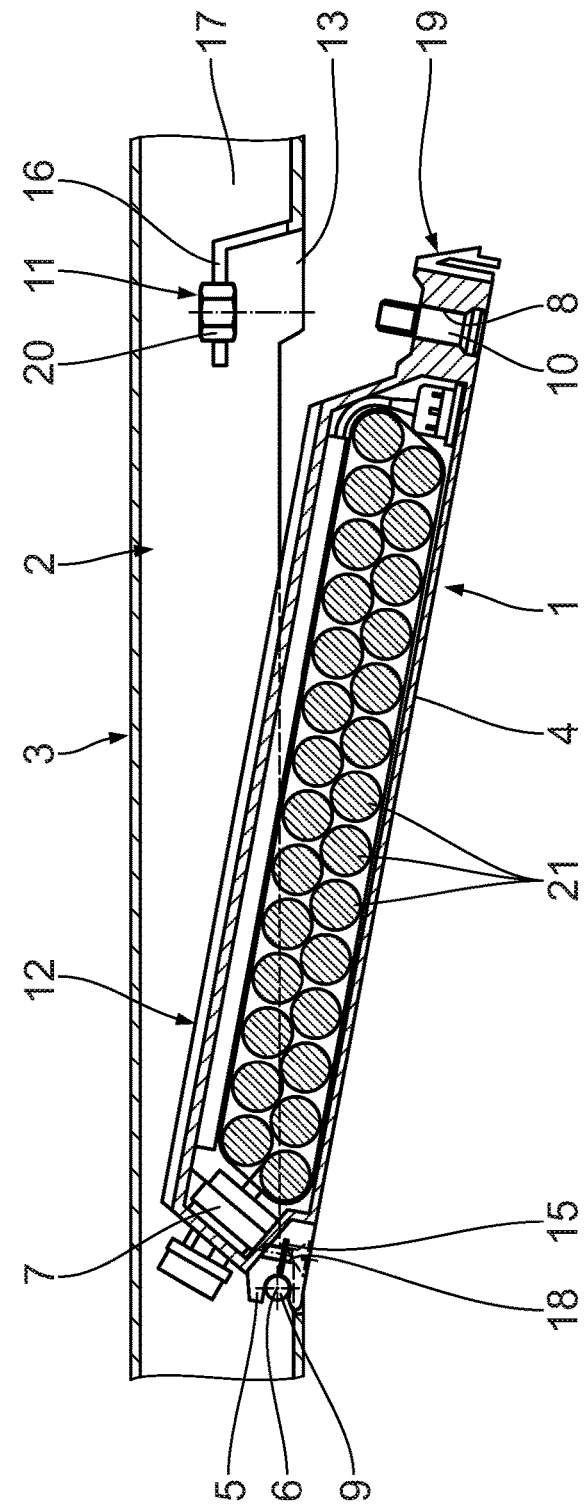
FIG. 18 shows a section through a bicycle frame and a battery unit along the longitudinal axis of the bicycle frame according to another alternative before the insertion of the battery unit into a receptacle device.
Figure 19:
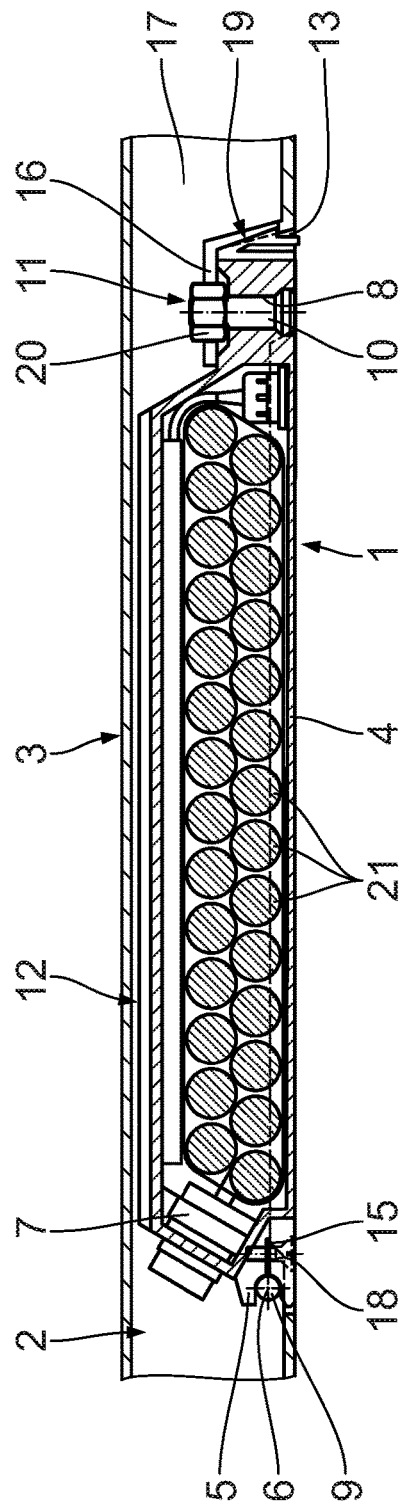
FIG. 19 shows a section through the bicycle frame and the battery unit along the longitudinal axis of the bicycle frame according to FIG. 18 after the insertion of the battery unit into the receptacle device.

According to the FIGS. 18 and 19, another alternative of the set is described, wherein constructively similar components have the same reference numbers as in the FIGS. 1 to 17 above.

According to this alternative, the complementary element 5 has a C-shaped cross section, wherein an additional slot 15 is provided. The slot 15, in this case, extends from a lowest point of the C-shaped cross section into the housing 12 of the battery unit 1. At the same time, the complementary element has a threaded hole 18, which is arranged, twisted by 90°, starting from the outside of the housing 12, against the slot 15 and crosses same. The threaded hole 18 serves for receiving the additional fixing means 11, which is a clamping screw according to the variant shown. The slot 15 allows for the two C-shaped wings of the complementary element 5 to be moved towards each other with the help of the clamping screw. Thus, an operative connection without play can be achieved between the first fixing element 9 and the C-shaped complementary element 5.

On the side opposite to the complementary element 5, the battery unit 1 shows a housing section 19 of reducing height as well as a vertical push-through opening 8. The vertical push-through opening 8, in this case, starting from the outside of the cover plate 4, extends across the entire reducing height of the housing section 19. The bicycle frame 3 and/or the receptacle device 2 are configured complementarily to the housing section 19. In particular, they show a receptacle opening 16, which is configured coaxially with the vertical push-through opening 8 in the end position of the battery unit 1. In the receptacle opening 16, a threaded nut 20 is mounted. The battery unit 1 can be fixed in the end position with the help of a screw which is stuck through the push-through opening 8 and screwed into the threaded nut 20.

Figure 20:
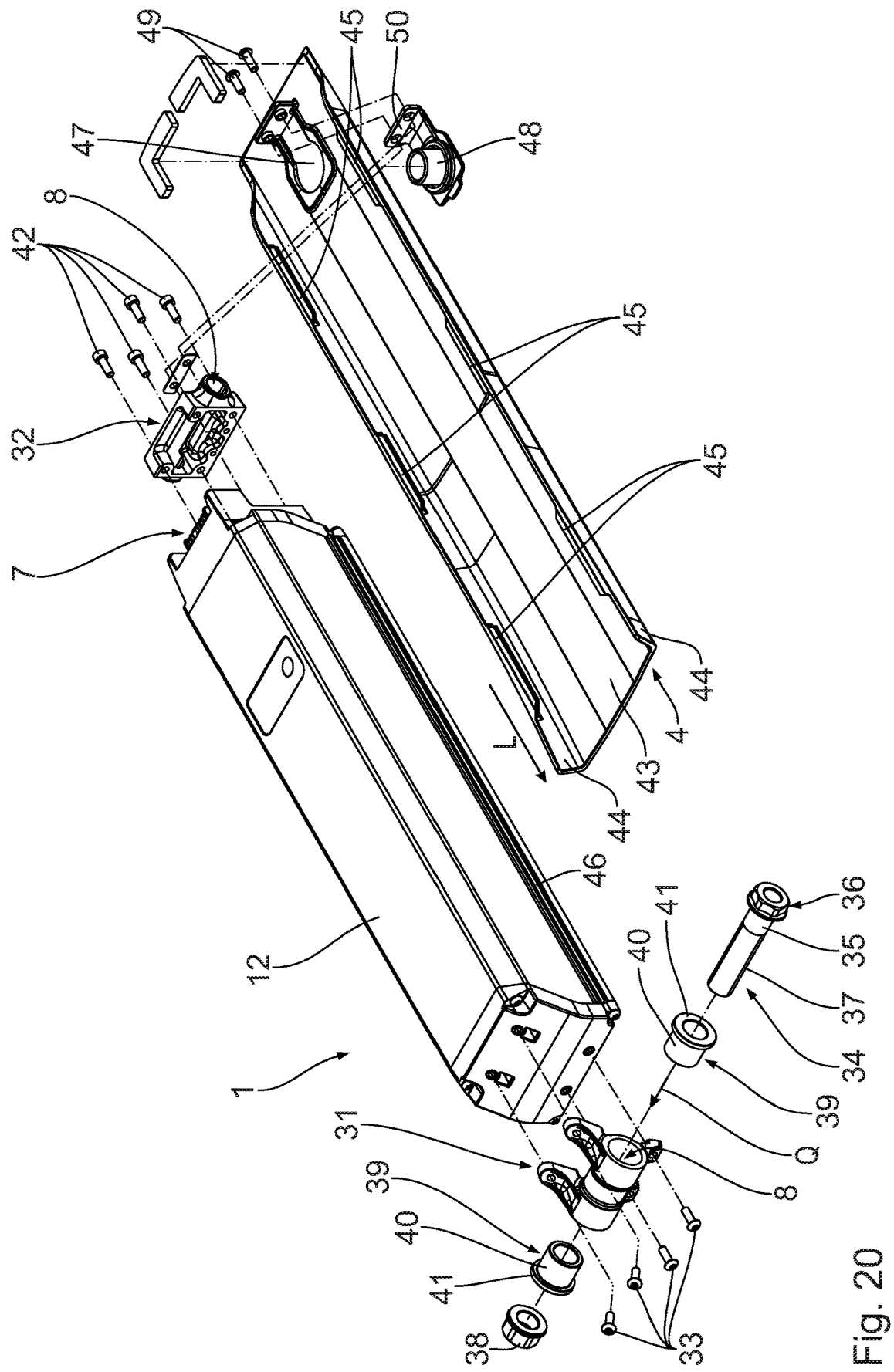
FIG. 20 shows an exploded view of a battery unit according to yet another variant.

In the following, another variant of the battery unit 1 or advantageous aspects thereof are described with reference to FIG. 20. With regard to general details of the battery unit 1, reference is made to the description of the embodiment according to FIGS. 1 and 2. Identical parts obtain identical reference numbers.

On the housing 12 of the battery unit 1, two receptacle elements 31, 32 for receiving supporting elements, in particular in the form of fixing elements 9, 10, are provided.

The receptacle element 31 is connected with the housing 12 by means of fastening elements. In particular, screws 33 serve as fastening elements. The screws 33 may, in particular, be Allen head screws or torx screws.

The receptacle element 31, in particular, is detachably connected with the housing 12.

The receptacle element 32 can be exchangeable.

The receptacle element 32, preferably, is made of metal or plastic material.

A slide-in shaft 34 is held by the receptacle element 31. The slide-in shaft 34 is configured as a hollow axle. It has a shaft 35. To both ends of the shaft 35, a contact element is arranged. The contact element, in particular, is a screw head 36.

The contact element, preferably, is configured in one part with the shaft 35.

According to an alternative, a nut serves as contact element, which can be screwed onto a male thread on the shaft 35.

On the end of the shaft 35 opposite to the screw head 36, a threaded portion 37 is arranged.

A contact element can be screwed onto the threaded portion 37. The contact element, in particular, is a nut 38.

The slide-in shaft 34 as well as the nut 38, preferably, are made of metal, for example aluminum or titan.

The slide-in shaft 34 is held in the receptacle element 31 by means of two reducing sleeves 39.

The reducing sleeves 39 are made of an elastic material, in particular of rubber. They have an inner portion 40 insertable into the push-through opening 8. Preferably, the have an abutment shoulder 41. This is not compulsory.

Instead of two reducing sleeves 39, one single continuous reducing sleeve may be provided, as well. Preferably, the latter shows a length which is larger than the extension of the receptacle element 31 along cross direction Q.

The extension of the receptacle element 31 in cross direction Q is smaller than the one of the housing 12 in cross direction Q.

The reducing sleeves 39 configure decoupling elements for at least partially mechanically decoupling the slide-in shaft 34 from the housing 12. In particular, they allow for a mechanic decoupling of the bicycle frame 3 from the housing 12.

The inner portion 40 of the reducing sleeves 39 shows an outer cross section, which is adapted to the inner cross section of the push-through opening 8. The reducing sleeves 39, in particular, may be arranged in a frictionally engaged manner in the push-through opening 8, i.e. in the receptacle element 31.

The reducing sleeves 39 show an inner cross section, which is adapted to the outer cross section of the slide-in shaft 34. The slide-in shaft 34, in particular, can be mounted in a frictionally engaged manner in the reducing sleeves 39. This mounting may have a slight play.

The slide-in shaft 34 is displaceable, in particular also with screwed-on nut 38, in cross direction Q relative to the receptacle element 31.

The slide-in shaft 34, in its inserted state in the receptacle element 31, can be inclined easily due to the elasticity of the reducing sleeves 39. Thus, it is possible to reduce the transfer of torsional forces from the bicycle frame 3 to the housing 12, in particular eliminate them as far as possible.

With the help of the nut 38, which can be screwed on, the effective length of the slide-in shaft 34 can be adapted to the width of the receptacle device 2. The effective length of the slide-in shaft 34, is in particular continuously adaptable.

In the area of the receptacle opening 16, a receptacle element intended for this purpose can be arranged in the receptacle device 2, in particular in the bicycle frame 3. The receptacle element, preferably, is made of the same material as the slide-in shaft 34, in particular of aluminum.

The fixing element 10, in particular in the form of a through bolt, can be struck through the slide-in shaft 34. With the help of the fixing element 10, the housing 12 can be mounted in a floating manner via the receptacle element 31 in the bicycle frame 3 or the receptacle device 2. In particular, it can be mounted floatingly, however vibration-free, in the receptacle device 2 or the bicycle frame 3.

According to an alternative not shown in the figures, the slide-in shaft 34 is configured in several parts. In particular, it may show two or more components which can be slotted together. The components of the slide-in shaft 34, in particular may slide on one another. The slide-in shaft, in this case, has a variable length. Thus, strains onto the bicycle frame can be further reduced.

The battery unit 1 shows a second receptacle element 32. The second receptacle element 32 is arranged on the opposite end of the housing 12 in longitudinal direction L.

The receptacle element 32 is exchangeable.

The receptacle element 32 is connected with the housing 12 by means of one or more fixing means. In particular, it is connected with the housing 12 by means of four screws 42. In particular, it is screwed to the housing 12.

The screws 42 are in particular Allen head screws or torx screws.

The receptacle element 32, preferably, is made of metal or plastic material.

The receptacle element 32 has the push-through opening 8. The push-through opening 8, preferably, is configured as an oblong hole or like an oblong hole. It shows an extension in longitudinal direction L, which is larger than its extension perpendicularly to the longitudinal direction L. This allows for a certain tolerance and/or a certain play in longitudinal direction L for the installation of the battery unit 1 in the receptacle device 2, in particular in the bicycle frame 3.

The receptacle element 32, in particular, is mounted to the housing 12 from the outside.

Additionally, the battery unit 1 has a cover plate 1.

The cover plate 4, preferably, is made of metal, plastic material or a fiber composite material. It shows at least sections made of one or more of these materials.

The cover plate 4, preferably, is configured in a profiled manner. It comprises a plate-type area 43, to the edge of which two side wings 44 are connected. The side wings 44 extend in longitudinal direction. They have a length which is shorter than the one of the plate-type area 43. Thus, the cover plate 4 does not show side wings in the area of at least one end. In this area, it is merely configured as a flat plate. This allows for a simplified and facilitated arrangement of the cover plate 4 on the bicycle frame 3.

The cover plate 4 is detachably connected with the housing 12 of the battery unit 1. In particular, it can be slid onto the housing 12 of the battery unit 1. In particular, it has several guiding elements 45, which can be accommodated, in particular guided, in two grooves 46 laterally arranged on the housing 12 of the battery unit 1.

The grooves 46 essentially extend across the entire length of the housing 12 of the battery unit 1. They extend in particular across at least 70%, in particular at least 80%, in particular at least 90% of the length of the battery unit 1.

According to an alternative, the grooves 46 are configured in a discontinued manner. In this case, the cover plate 4 need not be slid into the grooves 46 across the entire length, but merely across a fraction of the length.

The guiding elements 45 are arranged in the area of a free end of the side wings 44, respectively. In particular, they protrude inwards from the side wings 44. They are aligned essentially in parallel to the plate-type area 43. With the help of the guiding elements 45 and the grooves 46, it can be achieved that the plate-type area 43, in mounted state of the cover plate, is arranged in a spaced manner to the housing 12 of the battery unit 1. Between the plate-type area 43 of the cover plate 4 and the housing 12 of the battery unit 1, in particular an air gap remains. Thus, the battery unit 1, in particular the housing 12 for the batteries 21, is further protected. In addition, this improves the heat transfer from the housing 12 of the battery unit 1. The distance between the plate-type area 43 and the surface of the housing 12 of the battery unit 1 can be stabilized by strut-like extensions. Such strut-like extensions can be arranged on the cover plate 4 and/or on the housing 12.

The cover plate 4 is screwed to the housing 12 of the battery unit 1 by means of two screws 49. Preferably, the screws 49 are Allen head screws or torx screws. They can be screwed into the housing 12 in particular in longitudinal direction L.

The cover plate 4 shows a recess 47. Through the recess 47, a charger connection for the batteries 21 is accessible. The recess 47 can be closed with a cover element 48. With the help of a cover element 48, the recess 47 can be closed in particular tightly, in particular in a water-tight manner. In particular, it is protected from splash water.

The cover element 48 is made of a flexible and/or elastic material. Preferably, it is made of rubber.

The cover element 48 is connected with the cover plate 4 and/or the housing 12 of the battery unit 1. In particular, it can be mounted with the help of the screws 49. Here, in particular a planar area 50 of the cover element 48 can be arranged between the cover plate 4 and the housing 12 of the battery unit 1. This leads to a slightly elastic connection between the cover plate 4 and the housing 12 of the battery unit 1. Due to the planar area 50 between the cover plate 4 and the housing 12 of the battery unit 1, the cover plate can be minimally displaceable and/or dampened relative to the battery unit 1. This is advantageous, for example, for compensating micro vibrations. By this means, in particular, the electric and/or electronic components of the battery unit 1 are better protected.

What is claimed is:

1. A battery unit (1) for a drive mechanism for a bicycle comprising:
    at least one battery (21),
    a housing (12) for receiving the at least one battery (21) with:
        at least one receptacle element (31) for receiving at least one supporting element (10) for mounting the battery unit (1) in or on a bicycle frame (3); and
        at least one decoupling element interacting with the receptacle element (31) for at least partially mechanically decoupling the supporting element (10) incorporated in the receptacle element (31) from the housing (12); and
    wherein the at least one decoupling element comprises a slide-in shaft (34), which is stuck through the at least one receptacle element (31); and
    wherein the at least one decoupling element comprises at least one of the group comprising an elastic and a flexible component, by means of which the slide-in shaft (34) is held in the receptacle element (31); and
    wherein the slide-in shaft (34), in its axial direction, has a play relative to the housing (12) of the battery unit (1), whereby transmission of torsional forces from the bicycle frame (3) to the housing (12) is reduced.

2. The battery unit (1) according to claim 1, wherein the at least one of the group comprising an elastic and a flexible component, by means of which the slide-in shaft (34) is held in the receptacle element (31), is configured as one of the group comprising a one-part and a multi-part reducing sleeve (39), which is stuck through a push-through opening (8) in the receptacle element (31).

3. The battery unit (1) according to claim 1, wherein the at least one slide-in shaft (34) is configured as a hollow axle.

4. The battery unit (1) according to claim 1, wherein the slide-in shaft (34) has a threaded portion (37) on at least one end.

5. The battery unit (1) according to claim 1, wherein the slide-in shaft (34) is configured in several parts, wherein at least two parts are displaceable against one another in axial direction.

6. The battery unit (1) according to claim 1, comprising at least one second receptacle element (32), which is configured as an oblong hole.

7. The battery unit (1) according to claim 1, wherein the at least one receptacle element (31, 32) is reversibly mounted to the housing (12) from the outside.

8. A set with:
    the battery unit (1) for drive mechanism for a bicycle according to claim 1; and
    a receptacle device (2) for receiving the battery unit (1); and
    wherein the battery unit (1) is arrangeable in a floating manner in the receptacle device (2).

9. The set according to claim 8, wherein at least one component of the battery unit (1) can be fixed without play in the receptacle device (2).

10. A bicycle frame (3) with a set according to claim 8.

11. The bicycle frame (3) according to claim 10, wherein the battery unit (1) can be fully integrated into the bicycle frame (3).

12. The bicycle frame according to claim 10, comprising the supporting element (10), which is configured such that it allows for a detachable mounting of the battery unit (1) in the receptacle device (2), wherein the supporting element (10) shows a selection from the following list: a toggle joint, an eccentric screw, a clamping plate, a clamping lever, which clamps the housing of the battery unit axially to the swivel lever, which clamps the housing of the battery unit axially to the swivel axis of the clamping lever, a locking mechanism, one of the group comprising one and several magnets.

13. The bicycle frame (3) according to claim 10, wherein the slide-in shaft (34) is detachably mounted to the bicycle frame (3) by means of at least one through bolt.

14. The bicycle frame (3) according to claim 13,
    wherein the battery unit (1) is mounted in an elastically dampened manner in the bicycle frame (3).

15. The battery unit (1) according to claim 1, wherein the slide-in shaft (34) is arranged in an inclinable manner in the receptacle element (31) reducing the transfer of torsional forces from the bicycle frame (3) to the housing (12).

16. A battery unit (1) for a drive mechanism for a bicycle comprising:
    at least one battery (21); and
    a housing (12) for receiving the at least one battery (21); and
    a cover (4) for closing a receptacle device (2) for receiving the battery (1); and
    wherein the cover (4) is reversibly mountable to the housing (12); and
    wherein the cover (4) comprises a plate area (43), which in a mounted state of the cover (4) is arranged in a spaced manner to the housing (12), creating an air gap, protecting the battery unit (1), and improving the heat transfer from the housing (12)
    wherein a distance between the plate area (43) and the surface of the housing (12) is stabilized by strut-shaped extensions.

17. The battery unit according to claim 16, wherein the strut-shaped extensions are arranged on the cover (4).

18. The battery unit according to claim 16, wherein the cover (4) comprises an elastic sealing lip, which is arranged on an inner side of the cover (4) facing the receptacle device (2).

19. A battery unit (1) for a drive mechanism for a bicycle comprising:
    at least one battery (21) and
    a housing (12) for receiving the at least one battery (21); and
    a cover (4) for closing a receptacle device (2) for receiving the battery (21);
    wherein the cover (4) is reversibly mountable to the housing (12); and
    wherein the cover (4) comprises a plate area (943), which in a mounted state of the cover is arranged in a spaced manner to the housing (12), creating an air gap, protecting the battery unit (1), and improving the heat transfer from the housing (12), and wherein the cover (4) is slid onto the housing (12) in a groove (46) configured on the housing (12) in a guided manner, wherein the groove (46) extends across at least 70% of the length of the battery unit.

* * * * *